US007969452B2

(12) United States Patent
Clark et al.

(10) Patent No.: US 7,969,452 B2
(45) Date of Patent: Jun. 28, 2011

(54) REPORTING FIXED-POINT INFORMATION FOR A GRAPHICAL MODEL

(75) Inventors: Martin Clark, Boston, MA (US); Michael H. McLernon, Attleboro, MA (US)

(73) Assignee: The MathWorks, Inc., Natick, MA (US)

( * ) Notice: Subject to any disclaimer, the term of this patent is extended or adjusted under 35 U.S.C. 154(b) by 805 days.

(21) Appl. No.: 11/701,062

(22) Filed: Jan. 31, 2007

(65) Prior Publication Data
US 2008/0180437 A1    Jul. 31, 2008

(51) Int. Cl.
  G09G 5/00    (2006.01)
  G09G 5/36    (2006.01)
(52) U.S. Cl. .................. 345/619; 345/641
(58) Field of Classification Search .......... 345/619
  See application file for complete search history.

(56) References Cited

U.S. PATENT DOCUMENTS

| | | | | |
|---|---|---|---|---|
| 5,652,909 A * | 7/1997 | Kodosky | ............. | 717/125 |
| 5,852,449 A * | 12/1998 | Esslinger et al. | ............. | 345/473 |
| 6,038,393 A * | 3/2000 | Iyengar et al. | ............. | 717/104 |
| 6,209,017 B1 * | 3/2001 | Lim et al. | ............. | 708/552 |
| 6,237,020 B1 * | 5/2001 | Leymann et al. | ............. | 709/201 |
| 6,473,794 B1 * | 10/2002 | Guheen et al. | ............. | 709/223 |
| 6,772,407 B1 * | 8/2004 | Leymann et al. | ............. | 717/100 |
| 6,785,881 B1 * | 8/2004 | Bartz et al. | ............. | 717/110 |
| 7,028,222 B2 * | 4/2006 | Peterson et al. | ............. | 714/38 |
| 7,185,315 B2 * | 2/2007 | Sharp et al. | ............. | 717/109 |
| 7,424,410 B2 * | 9/2008 | Orofino et al. | ............. | 703/2 |
| 7,596,474 B2 * | 9/2009 | Langemyr et al. | ............. | 703/2 |
| 2001/0035879 A1 * | 11/2001 | Washington et al. | ......... | 345/763 |
| 2004/0210578 A1 * | 10/2004 | Taitel | ............. | 707/8 |
| 2006/0058976 A1 * | 3/2006 | Ferris | ............. | 702/123 |
| 2007/0266368 A1 * | 11/2007 | Szpak et al. | ............. | 717/105 |
| 2008/0209425 A1 * | 8/2008 | Ferris | ............. | 718/102 |
| 2009/0007063 A1 * | 1/2009 | Szpak et al. | ............. | 717/105 |
| 2009/0083358 A1 * | 3/2009 | Allen | ............. | 708/495 |

OTHER PUBLICATIONS

The MathWorks, "Simulink® Fixed Point™ 5, User's Guide," The MathWorks, Inc. (Mar. 2005).
The MathWorks, "Simulink, Simulation and Model-Based Design, Using Simulink®, Version 6," The MathWorks, Inc. (2006).
Invitation to Pay Additional Fees for Application No. PCT/US2008/001064, dated Jul. 28, 2008.
European Office Action for Application No. 08713307.0, dated Jul. 5, 2010.

* cited by examiner

*Primary Examiner* — Javid A Amini
(74) *Attorney, Agent, or Firm* — Nelson Mullins Riley & Scarborough LLP; Kevin J. Canning; Neslihan I. Doran

(57) ABSTRACT

A graphical modeling environment is provided for a user to build a model in which signals and/or block parameters can be represented using a fixed-point data type. When the graphical model is executed, the graphical model may generate fixed-point data type signals. An exemplary embodiment may information about fixed-point data type signals on the graphical model. Based on the information provided on the graphical model, the user may be able to determine whether an appropriate number of bits are allocated to the integer part of the fixed-point data type signals and/or whether the total number of bits, i.e., the word length is adequate or over-engineered.

68 Claims, 7 Drawing Sheets

REPORTING FIXED-POINT INFORMATION FOR A GRAPHICAL MODEL

BACKGROUND

Graphical modeling environments, such as the Simulink® environment from The MathWorks, Inc., allow engineers to build dynamic system models using a graphical representation. One variety of a graphical model may be a block diagram representation. The block diagram representation can be a graphical representation of a mathematical model of the dynamic system. The Simulink® environment provides reusable components called library blocks for the creation of graphical models. In the graphical models, blocks may be connected through signals that pass between connected blocks.

The values of signals or block parameters in a graphical modeling environment may be represented in a format called data type. The data type determines how a computer represents numbers in memory and relates to the amount of storage allocated to the numbers. The graphical modeling environment may allow a user or programmer to specify the data types of signals and block parameters in a graphical model. For example, the Simulink® environment allows the user to create models that use floating-point data types and/or fixed-point data types to represent signals and parameter values. A fixed-point data type is a method for representing numerical values with a set range and precision, whereas a floating-point data type is a method for representing numerical values with a changing range and precision.

SUMMARY

Code may be generated from a graphical model and executed to simulate the behavior of the graphical model. The generated code may be deployed to hardware for execution. The use of a fixed-point data type in a graphical model can reduce the size, and increase the execution speed, of code generated from the graphical model. Furthermore, in implementing hardware, the use of a fixed-point data type can make the hardware cheaper. Therefore, the ability to specify an optimal range and precision to use to represent signals and block parameters may be important in a fixed-point graphical model design. By choosing the most appropriate range and precision for signals and block parameters in a graphical model, the user can increase performance of code generated from the graphical model.

An exemplary embodiment provides a graphical modeling environment in which a user can build and execute a graphical model for dynamic systems using blocks connected through signals. An exemplary embodiment may allow signals and/or block parameters in a graphical model to be represented in a fixed-point data type. The fixed-point data type may be defined by a word length, a fraction length, and whether data is signed or unsigned. When the graphical model is executed, the graphical model may generate signals the values of which are represented in a fixed-point data type. An exemplary embodiment may provide information about fixed-point data type signals on the graphical model. An exemplary embodiment may provide information about the maximum and/or minimum values of the signals, and how often the signals overflow or underflow, i.e., how often small values get approximated by zero. Based on the information provided on the graphical model, the user may be able to determine whether an appropriate number of bits are allocated to the integer part of the fixed-point data type signals and/or whether the total number of bits, i.e., the word length is adequate or over-engineered. The user may use the information to change a scaling factor for the fixed-point data type signals and iteratively refine the design of the graphical model.

In another exemplary embodiment, signals may be colored to provide information about the maximum and/or minimum values of fixed-point data type signals. For example, the signals may be colored red for a large maximum value, blue for a small maximum value, and shades of red-blue in between. In a similar way, blocks can be shaded (background color) to provide information about whether the signals generated from the blocks overflow, or underflow, or whether the integer part of the signals is assigned with an appropriate number of bits. For example, blocks can be shaded red in varying brightness to connote the percentage or number of overflows or underflows, blue to connote the number of bits of headroom. Other visual cues such as varying hue, saturation, etc. may be applied to shade the blocks. The term 'shading' may be used to refer to depicting different levels of brightness, hue, saturation, etc. The shading may include cross-hatching where lines of varying closeness are drawn in a grid pattern to shade an area.

A large maximum value refers to the maximum of a signal with a large dynamic range and a small maximum value refers to the maximum of a signal with a small dynamic range. Other information about maximum and minimum values can be derived such as, for example, the largest of a number of maximums of a signal obtained over a number of simulations ('max-max'), the smallest of a number of such maximums ('min-max'), the largest and smallest of minimums of a signal obtained over a number of simulations ('max-min' and 'min-max'), the largest of the maximums of a number of different signals in a model over a simulation, the smallest of such maximums, the largest minimum of different signals in a model over a simulation, the smallest such minimums, etc.

In another exemplary embodiment, minimum and/or maximum values, actual fixed-point integer/fraction lengths, percent of overflows, the number of overflows, percent of underflows, the number of underflows, the number of bits of headroom, etc. of fixed-point data type signals can be provided on a separate user interface.

In another exemplary embodiment, a computer-implemented method may be provided for modeling a system using a fixed-point data type in a graphical modeling environment. A graphical model may be executed in the graphical modeling environment. The graphical model includes a first element that generates a fixed-point data type signal. A link connecting the first element to a second element may be displayed in color on the graphical model based on information about the fixed-point data type signal.

In an exemplary embodiment, a system may be provided for modeling a system using a fixed-point data type in a graphical modeling environment. The system includes an execution engine for executing a graphical model in the graphical modeling environment. The graphical model has a first element that generates a fixed-point data type signal. The system also includes a user interface for displaying a link connecting the first element to a second element in color on the graphical model based on information about the fixed-point data type signal.

In an exemplary embodiment, a medium may be provided for use with a computing device holding instructions executable by the computing device. A graphical model may be executed in the graphical modeling environment. The graphical model includes a first element that generates a fixed-point data type signal. A link connecting the first element to a second element may be displayed in color on the graphical model based on information about the fixed-point data type signal.

BRIEF DESCRIPTION OF THE DRAWINGS

The aforementioned features and advantages, and other features will become better understood with regard to the following description and accompanying drawings, wherein.

DETAILED DESCRIPTION

Figure 1:
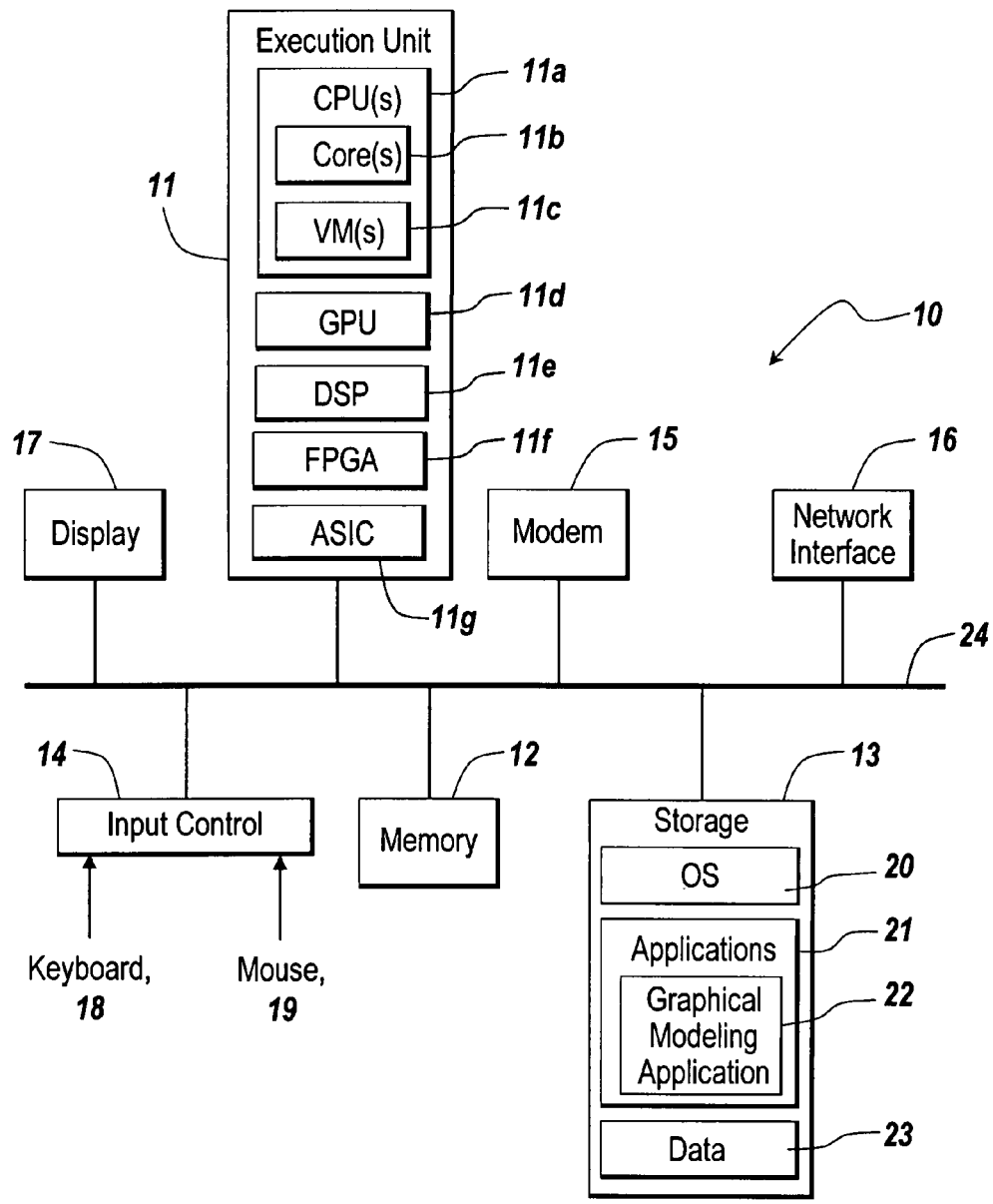
FIG. 1 shows an exemplary computing device suitable for practicing an exemplary embodiment.

An exemplary embodiment may provide a graphical modeling environment in which a user can build, edit and execute a graphical model for systems using components or elements, such as blocks and signals. In a graphical model, signals may be represented by directed lines or links to indicate that the signals are generated from the model blocks where the directed lines or links start, and read by the model blocks where the directed lines or links end. In an exemplary embodiment, the values of signals and/or block parameters may be represented in a fixed-point data type. In the fixed-point data type, a decimal or binary point is fixed while the decimal or binary point is referred to as floating in a floating-point data type.

When a graphical model is executed, fixed-point data type signals may be generated from the graphical model. An exemplary embodiment may provide information about the fixed-point data type signals on the graphical model. In an exemplary embodiment, model blocks and/or signals may be colored to convey information about the fixed-point data type signals. In another embodiment, model blocks and/or signals may be shaded to provide the information. An exemplary embodiment may provide information about the maximum and/or minimum values of the fixed-point data type signals, and/or how often the fixed-point data type signals overflow, or underflow. Based on the information, the user may be able to determine whether an appropriate number of bits are allocated to the integer part of the fixed-point data type signals and/or whether the total number of bits, i.e., the word length is adequate or over-engineered. The user may adjust the number of bits allocated to the integer part of the fixed-point data type signals to generate efficient code from the graphical model.

In the description of an exemplary embodiment, a signal overflow refers to a condition where the value of the signal exceeds the representation boundary of a fixed length buffer allocated for the signal. A signal underflow refers to a condition where the value of signal is too small to represent with the fixed length buffer allocated for the signal. For example, when eight decimal places are allocated to the signal and the value of the signal is, for example, 0.000000001 (nine decimal places), an underflow occurs. This decimal representation is for illustrative purposes and the underflow may occur in other representations, such as a binary representation.

An exemplary embodiment may log data generated in a graphical model. An exemplary embodiment may log the values of the signals generated from selected model blocks in the graphical model. An exemplary embodiment may display a pop-up window in response to a user action, such as mouse-over a model component. The pop-up window may display detailed information about the fixed-point signals generated from the model block. An exemplary embodiment may display a histogram that visualizes the dynamic range of fixed-point data type signals in a graphical model. The histogram may visualize dynamic range of the signals in terms of the number of bits of the signals. The histogram may also display floating-point references for a user to compare the fixed-point data type signals with the floating-point references.

An exemplary embodiment will be described relative to a time-based block diagram modeling environment, such as the Simulink® environment from The MathWorks, Inc. of Natick, Mass. Other embodiments are not limited to the time-based block diagram modeling environment, and may include other graphical modeling environments. Examples of graphical modeling environments include, but are not limited to, a discrete-event system modeling and simulation environment, such as the SimEvents™ environment from The MathWorks, Inc., of Natick, Mass., a dataflow modeling and simulation environment, such as those provided by LabVIEW® from National Instruments Corporation of Austin, Tex., a state-based and flow diagram modeling and simulation environment, such as the Stateflow® environment from The MathWorks, Inc., of Natick, Mass. or any graphical tools that provide a signal-based modeling environment. Further examples of graphical modeling environments that may be used to develop and/or execute a graphical model in accordance with exemplary embodiments include, but are not limited to, LabVIEW® or MATRIXx from National Instruments, Inc., SoftWIRE by Measurement Computing, VisSim by Visual Solutions, WiT by DALSA Coreco, VEE Pro by Agilent, Dymola from Dynasim AB, Extend from Imagine That, Inc., Scicos from The French National Institution for Research in Computer Science and Control (INRIA), MSC.Adams® from MSC.Software Corporation, Rhapsody® from iLogix, Inc., Rational® from International Business Machines Corporation, ARTiSAN Studio from ARTiSAN Software Tools, Inc., SCADE™ from Esterel Technologies, Inc., among others. Exemplary embodiments can also be used in a text based environment, such as a text based modeling and/or text based programming environment.

An exemplary embodiment may extend ways of graphically highlighting to text-based programming environments, such as the MATLAB® environment. An exemplary embodiment may highlight lines of text-based programs to provide fixed-point information relating to the highlighted lines. Exemplary embodiments may employ various ways of graphical highlighting techniques, such as different font colors, different background colors, different font style, different font size, underline, bold, italics, normal, faded, semi transparent, etc., to provide fixed-point data type information. The term "highlighting" may be used to refer to emphasizing or making prominent a variable or operation/function in a textual environment.

An exemplary embodiment may provide mouse-over information regarding fixed-point information of the lines over which the pointing device moves. The mouse-over information may be provided in, for example, a popup, a tooltip, a dedicated separate window, a specific area on the model canvas, etc. The editors of the text-based programming environments may provide these capabilities. Text-based programming environments may include Mathematica® from Wolfram Research, Inc., Maple™ from Maplesoft, a division of Waterloo Maple Inc., Scilab™ from The French National Institution for Research in Computer Science and Control (INRIA), Le Chesnay Cedex, France, etc. These environments may be included in graphical models that have text-based aspects.

FIG. 1 is an exemplary computing device 10 suitable for practicing an exemplary embodiment. The computing device 10 is intended to be illustrative and may take many forms, including but not limited to a workstation, server, network computer, quantum computer, optical computer, bio computer, Internet appliance, mobile device, pager, tablet computer, etc.

The computing device 10 may be electronic or optical, for example, and may include an execution unit 11, a memory 12, a storage device 13, an input control 14, a modem 15, a network interface 16, and a display 17. The execution unit 11 may control components of the computing device 10 to provide a graphical modeling environment. The memory 12 may store instructions or data and may provide them to the execution unit 11 so that the execution unit 11 can operate the computing device 10 and can run the graphical modeling environment. The storage 13 may contain software tools for applications. In one implementation, storage 13 can include code for the operating system (OS) 20 of the device 10, code for applications 21 running on the operation system 20 including applications 22 for providing the graphical modeling environment, and data 23 for the graphical models generated in the graphical modeling environment. In other implementations, the applications can be stored in the memory 12 or they can be stored on a network device, such as a networked storage device.

Optionally, the computing device 10 may include single or multiple Central Processing Units (CPUs) 11a for executing software loaded in the memory 12, and other programs for controlling system hardware. The CPU 11a can include a single core or multiple cores 11b. The code loaded in the memory 12 may run in a virtualized environment, such as in a Virtual Machine (VM) 11c. Multiple VMs 11c may be resident on a single processor. Also, part of the application could be run in hardware, for example, a graphics processing unit (GPU) 11d, digital signal processor (DSP) 11e, a field programmable gate array (FPGA) 11f or an application specific integrated circuit (ASIC) 11g.

The input control 14 may interface with a keyboard 18, a mouse 19, and/or other input devices, such as neuro interfaces and motion-based (e.g., accelerometer and gyroscopic) interface devices. The computing device 10 may receive through the input control 14 input data necessary for creating models, such as the selection of the attributes and operations of components in the models. For example, the user may input parameters of components via, for example, dialog boxes of the components in the models. The computing device 10 may also receive through the input control 14 input data necessary for controlling the execution of the models. Display 17 may present user interfaces to allow users to create, edit, simulate, execute, etc., the models. The resources depicted in FIG. 1 may be connected to each other through the bus 24. The bus 24 may be an on-chip, off-chip or network bus and/or may include various other implementations, such as Peripheral Component Interconnect (PCI) and PCMCI.

Figure 2:
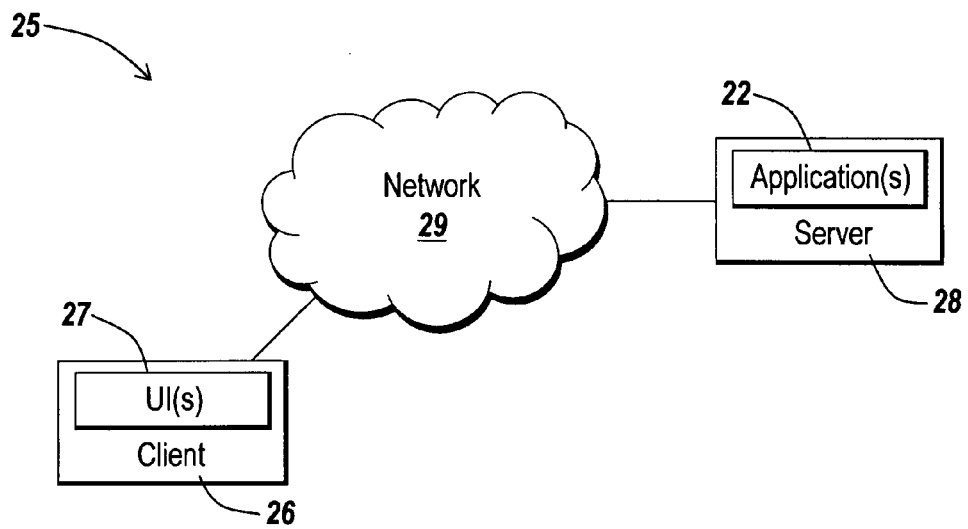
FIG. 2 depicts an exemplary network environment suitable for running a distributed implementation of an exemplary embodiment.

FIG. 2 depicts an exemplary network environment 25 suitable for implementing a distributed embodiment. The client 26 and server 28 may be coupled to the network 29 through communication links. The network interface 16 and the modem 15 (shown in FIG. 1) of the computing device 10 may enable the client 26 to communicate with the server 28 through the communication network 29. The communication network 29 may include a control-area network, Internet, intranet, LAN (Local Area Network), WAN (Wide Area Network), MAN (Metropolitan Area Network), Wireless, Optical, etc. Communication facilities can support the distributed implementations of exemplary embodiments. The network interface may employ a variety of connections including, but not limited to, standard telephone lines, LAN or WAN links (e.g., T1, T3, 56 kb, X.25), broadband connections (e.g., Integrated Services Digital Network (ISDN), Frame Relay, Asynchronous Transfer Mode (ATM)), cluster interconnection (Myrinet), Peripheral Component Interconnect (PCI), PCI Extended (PCI-X)), wireless connections (e.g., IEEE 802.11 and IEEE 802.16), or some combination of any or all of the above.

In an exemplary embodiment, the client 26 may include user interfaces 27 for a user to create, edit, simulate, or execute a model on the client 26. The server 28 may include applications 22 for a graphical modeling environment that enables a user to create a graphical model. The server 28 may provide the applications 22 to the client 26 according to certain conditions, such as a license agreement. The client 26 may use the applications 22 provided from the server 28 and may create a graphical model. The client 26 may execute the graphical model or may send the graphical model to the server 28 for execution. The server 28 may then return the execution results to the client 26 so that the user can determine the behavior of the graphical model.

An exemplary embodiment may be practiced with different types of graphical modeling environments, such as a signal-based modeling and simulation environment, a time-based block diagram modeling and simulation environment, a state-based and flow diagram modeling and simulation environment, a discrete-event system modeling and simulation environment, and a dataflow modeling and simulation environment. An exemplary embodiment may also be practiced with Unified Modeling Language (UML) modeling and simulation environments. Another exemplary embodiment may extend to a text-based programming environment, such as the MATLAB® environment. The text-based programming environment may provide graphical outputs based on an analysis of fixed-point data types in text-based programs.

Figure 3:
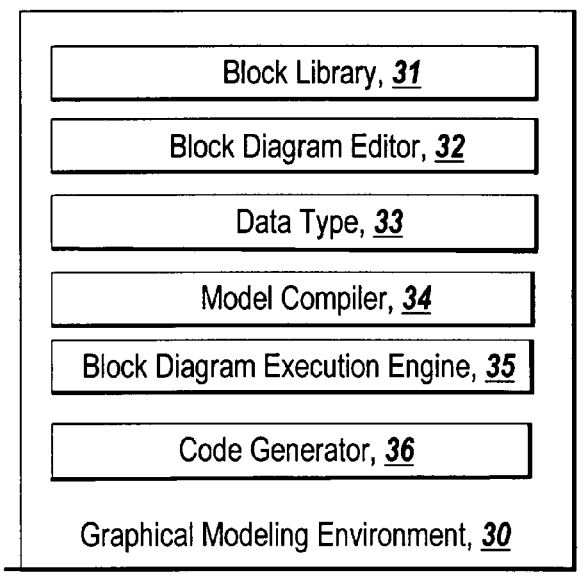
FIG. 3 depicts an exemplary graphical modeling environment provided in an exemplary embodiment.

FIG. 3 depicts an example of the graphical modeling environment 30 (hereinafter environment 30). Environment 30 may enable users to design a graphical model for a system, simulate the system's behavior, analyze the performance of the system, and refine the design of the system. In the environment 30, users may build a graphical model, such as a block diagram model, using blocks provided in a block library 31. The users may be able to customize this block library 31 to reorganize blocks in a user-defined format, to delete undesired blocks, and/or to add custom blocks users have designed. The blocks may be moved via a human-machine interface, such as the mouse 19 or keyboard 18, from the block library 31 onto a window (e.g., model canvas included in an area of a display device).

The environment 30 may include a block diagram editor 32 that allows users to perform such actions as draw, edit, annotate, save, print, etc., block diagram representations of systems. The block diagram editor 32 is a graphical user interface (GUI) component that allows drafting of graphical models by users. In the graphical modeling environment 30, there may be a textual interface with a set of commands that allow interaction with the block diagram editor 32. Using this textual interface, users may write scripts that perform automatic editing, processing, and execution operations on the graphical model.

The environment 30 may provide a dialog box for enabling users to specify attributes, methods and/or parameters of the blocks in the graphical model. Using the dialog box, the users may specify the data types 33 of block parameters and/or signals generated from the blocks. The environment 30 may support various data types 33, including fixed-point data types. The environment 30 may also support other data types 33, such as double-precision floating-point data types, single-precision floating-point data types, integer data types (8-bits, 16-bits, and 32-bits), unsigned integer data types (8-bits, 16-bits, and 32-bits), user-defined data types, etc. The data types 33 describe representation, interpretation and structure of values of the block parameters and/or signals stored in computer memory or other storage device.

Once a graphical model has been constructed within the environment 30, the model may be executed in the environment 30. The environment 30 may include a model compiler 34 that carries out the task of compiling and linking the graphical model to produce an "in-memory executable" version of the model that is used for generating code and/or simulating a graphical model. The compile stage involves preparing data structures and evaluating parameters, configuring and propagating block characteristics, determining block connectivity, and performing block reduction and block insertion.

The environment 30 may also include a block diagram execution engine 35 for executing the "in-memory executable" version of a graphical model or the generated code for the model. In executing a graphical model, the block diagram execution engine 35 may evaluate the state, the derivative with respect to time of the state, and output of the components in the model. Code may or may not be generated from the model by the code generator 36. When code is generated, the model may be simulated/executed through an accelerated simulation mode in which the graphical model (or portions of it) is translated into either software modules or hardware descriptions (broadly termed "code"). In an external mode, the generated code may be executed on a target other than the processor(s) on which the graphical modeling environment executes. When code is not generated, the graphical model may execute in an interpretive mode in which the compiled and linked version of the graphical model may be directly utilized to execute the model over the desired time-span. This interpretive mode of execution is suitable for obtaining fine-grained signal traceability. In other implementations, when users generate code, they may choose to not proceed further with the execution of the graphical model. They may choose to take the code and deploy it outside of the confines of the modeling software environment.

Figure 4:
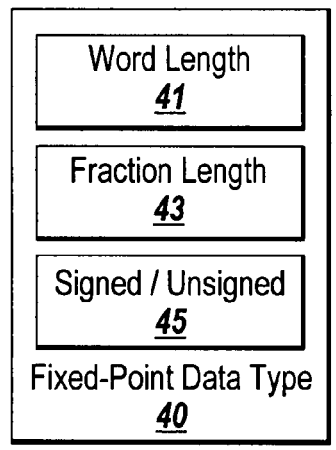
FIG. 4 depicts an exemplary fixed-point data type provided in an exemplary embodiment.

FIG. 4 depicts an example of a fixed-point data type 40 and the various properties, characteristics, or attributes that may be used to define or specify a data type representing a fixed-point number. A fixed-point data type 40 may be defined, specified, or configured by a fraction length 43, an indication whether the number is signed/unsigned 45, and word length or number of bits 41. The fraction length 43 property may be any integer value and represents the distance from the least significant bit (LSB) to the binary point. The signed/unsigned property 45 indicates whether the fixed-point number is zero or positive (unsigned) unsigned or negative (signed). The word length 41 property is the word length, in bits, of the stored integer value of a fixed-point number, and can be any positive integer value.

Fixed-point data types may be integers, fractions, or general fixed-point numbers. One of the differences between fixed-point and floating-point data types is the default binary point, which is the means by which fixed-point numbers are scaled. A fixed-point number may be encoded in a computer using a slope-bias encoding scheme. For example, a real number R may be encoded in a computer using a binary integer or quantized value Q by the following equation: R=S*Q+B, where S and B are real numbers. S is referred to as the slope and B as the bias. Q is computed by solving the equation and then rounding the result to an integer value.

The integer is the part of a fixed-point number represented by the bits to the left of a binary point. The slope can be expressed as:

$$\text{slope}=\text{fractionalslope} \times 2^{exponent}$$

The exponent is equal to the negative of the fraction length 43. The slope and the bias together represent the scaling of the fixed-point number.

The fixed-point data type 40 may be specified or configured programmatically, such as via an API call. For example, the fixed-point data type 40 of a variable may be set dynamically at the runtime of a graphical model. Also, the fixed-point data type 40 may be specified or configured graphically via any type and/or form of user interface mechanism, such as a user interface of the Simulink® Fixed-Point environment in an exemplary embodiment.

Figure 5:
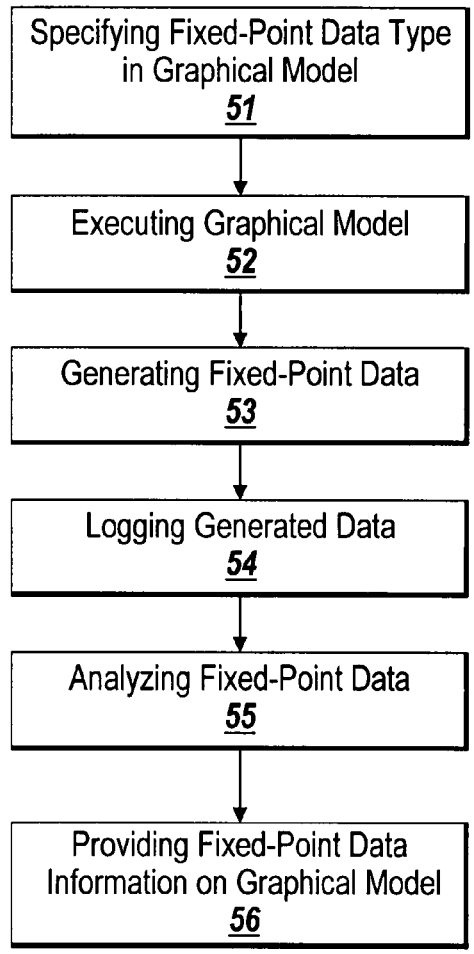
FIG. 5 shows exemplary processing for reporting fixed-point information in an exemplary embodiment.

FIG. 5 is a flow chart showing an exemplary process for reporting information about fixed-point data type signals in a graphical modeling environment 30. Users may build a graphical model for a dynamic system using the block diagram editor 32. The block diagram editor 32 may provide user interfaces that enable the users to instantiate blocks from block library 31 and specify the attributes of the block components in the graphical model. For example, the users may specify data types, such as fixed-point data types or floating-point data types, for the signals generated from the block components in the graphical model (step 51).

When the model is executed in the graphical modeling environment (step 52), the block components in the graphical model may generate signals of the data types specified for the block components (step 53). The block diagram execution engine 35 may log the values of the signals generated from selected block components in the graphical model (step 54). The block components may be selected by block parameters or all of the block components in the graphical model may be selected by overriding the graphical model.

The logged data may be analyzed to provide fixed-point information to the users (step 55). For example, minimum and/or maximum values, a minimum positive value, a minimum negative value, dynamic range may be determined for fixed-point data type signals. Furthermore, it may be determined whether the logged maximum value is a large maximum value or a small maximum value. The range of a large maximum value or a small maximum value may be predetermined by a user. The minimum value may be analyzed in a similar way. The dynamic range of a signal can be determined from the maximum value and the minimum value of the signal. In an exemplary embodiment, the number or percentage of overflows and/or underflows can be determined for fixed-point data type signals. In an exemplary embodiment, the number of bits of headroom can be calculated for fixed-point data type signals. Headroom refers to the amount by which the maximum allowable signal value exceeds the maximum signal value. In an exemplary embodiment, logged data may be analyzed to obtain other information, such as a minimum positive value, a minimum negative value, and recommended word and fraction lengths.

The analyzed information about the fixed-point data type signals can be provided on the graphical model (step 56). In an exemplary embodiment, signals may be colored to provide information about the maximum and/or minimum values of fixed-point data type signals. For example, the signals and/or block components may be colored red for a large maximum value, blue for a small maximum value, and magenta in between. In general, a heat map based spectrum can be used relating high with hot and low with cold. Information on a minimum value and dynamic range may be provided in a similar manner. In an exemplary embodiment, the background of blocks can be colored to provide information about whether the signals generated from the blocks overflow, or underflow. The background of blocks can also be colored to provide information about whether the integer part of the signals generated from the blocks is assigned with an appropriate number of bits. For example, the background of blocks can be colored red with varying brightness to connote the number or percentage of overflows, and blue with varying brightness to connote the number of bits of headroom.

Exemplary embodiments may also use a varying width of the line, a bar like, for example, a progress bar, along side the line, with max and min markers. The bar can be parallel and perpendicular to the line.

In an exemplary embodiment, a user may be allowed to configure the visual cues to use for displaying specific information of fixed-point data type signals. The user interface may be provided in conjunction with the fixed-point data type signals or the blocks from which the fixed-point data type signals are generated. The user interface may provide options for selecting one or more visual cues to display specific information of the fixed-point data type signals. For example, the user interface may enable a user to select various colors to display different information of the fixed-point data type signals.

In an exemplary embodiment, detailed information on fixed-point data type signals, such as the minimum and/or maximum values, actual fixed-point integer/fraction lengths, the number or percent of overflows/underflows, the number of bits of headroom, etc. can be provided on a separate user interface. In an exemplary embodiment, the separate user interface may be superimposed on the graphical model.

Figure 6:
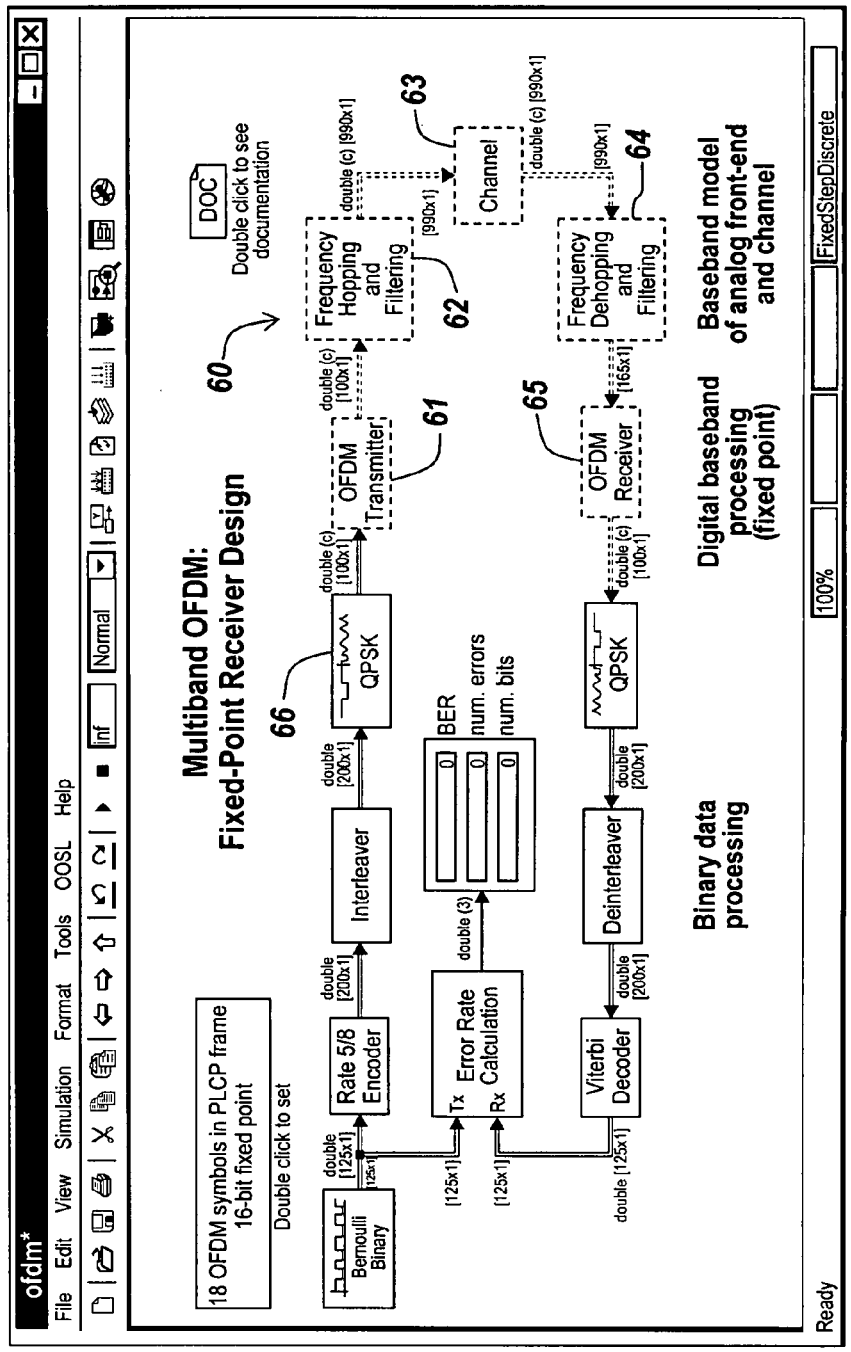
FIG. 6 depicts an exemplary graphical model executed in an exemplary embodiment.

FIG. 6 is an exemplary graphical model 60 built in the graphical modeling environment using floating point-data types and fixed-point data types. The graphical model 60 represents an exemplary multi-band orthogonal frequency division multiplexing (OFDM) system in which signals are transmitted using a frequency hopping (multi-band) scheme. The system includes OFDM transmitter block 61 and OFDM receiver block 65 that are designed using fixed-point data types. The OFDM transmitter block 61 is a subsystem that transforms a payload of Quadrature Phase Shift Keying (QPSK) symbols generated from a QPSK block 66 into a large frame of OFDM symbols to be passed along to the front-end of the transmitter. A frame is a data packet of fixed or variable length. Frame-based signals may be represented as vectors or matrices. For example, an M-by-1 frame-based vector may represent M consecutive sample signals from one channel and an M-by-N frame-based matrix may represent M consecutive samples from N independent channels. Each row of the vectors or matrices represents one sample signal, or time slice from distinct signal charmers. The frequency hopping and filtering block 62 and the frequency de-hopping and filtering block 64 represent the base band model of analog front-ends that are coupled to a channel block 63 representing a communication channel.

In an exemplary embodiment, the blocks 61-65 and signals generated from the blocks 61-65 are colored, for example, in green to indicate that the blocks 61-65 are arithmetic subsystems/blocks that use floating-point override. In an exemplary embodiment, floating-point data types can override the fixed-point data type block parameters and signals in the graphical model 60 to enable a user to compare a fixed-point data type model design with a floating-point data type model design. The floating-point model design can be used as a reference for the fixed-point data type model design. For example, the Simulink® environment provides a data-type override feature that enables a user to switch between fixed-point data types and floating-point data types for any subsystem or for the entire model. When the data-type override is selected, the output data type of the blocks in the current system or subsystem is overridden with floating-point data type.

Figure 7:
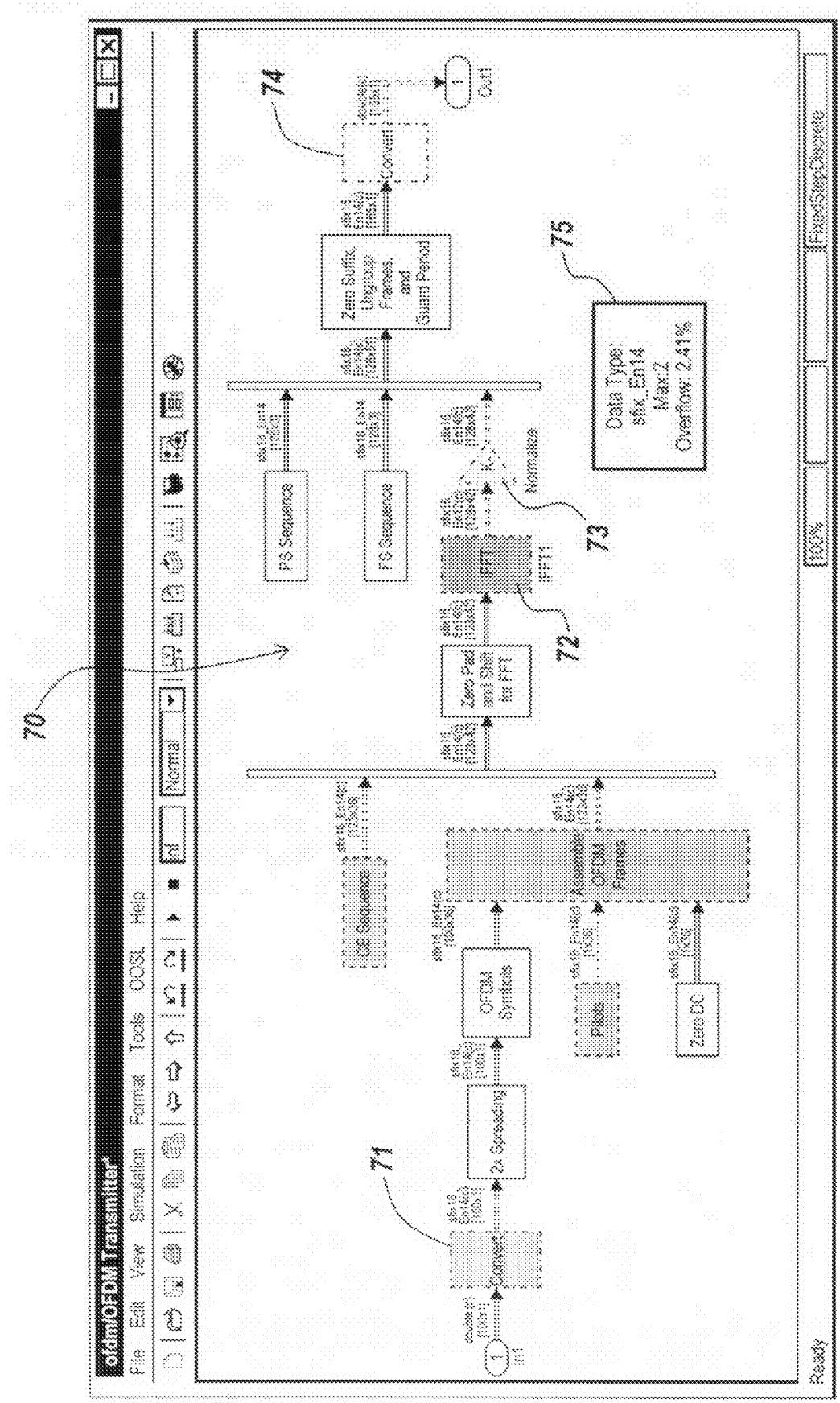
FIG. 7 shows an exemplary subsystem model for the transmitter block depicted in FIG. 6.

FIG. 7 is an exemplary subsystem model 70 for the transmitter block 61 depicted in FIG. 6. The subsystem model 70 includes a converter block 71 that converts incoming signals into a fixed-point data type. The subsystem model 70 includes another converter block 74 that converts input signals into a floating-point data type. The subsystem model 70 also includes the inverse fast Fourier transform (IFFT) block 72 and gain block 73 that perform fixed-point arithmetic.

When the graphical model 60 is executed, blocks and/or signals generated from the blocks may be colored to provide information about the maximum or minimum values of the signals. In the subsystem model 70, for example, the blocks 71-74 and signals generated from the blocks 71-74 are colored in magenta to indicate that the maximum values of the signals generated from the blocks 71-74 are in the range between a large maximum value and a small maximum value. The range of a large maximum value and a small maximum value can be pre-determined by a user.

In an exemplary embodiment, the background of blocks may be colored to provide information about whether the signals generated from the blocks overflow, or underflow. In the subsystem model 70, for example, the background of the gain block 73 is colored in red to indicate that the signal from the gain block 73 overflows. The background of the gain block 73 may be colored differently according to the number or percentage of overflows in the signals. The number or percentage of overflows and a matching color can be pre-determined by a user. The underflow information may be provided in a similar manner.

In an exemplary embodiment, the background of blocks may be colored to provide information about the number of bits of headroom in the signals. In the subsystem model 70, for example, the background of the blocks 71 and 72 is shaded to indicate that the signals from the blocks 71 and 72 include bits of headroom. In an embodiment, the background color of the block may be colored differently depending upon the number of bits of headroom in the signals. The number of bits of headroom and a matching color can be pre-determined by a user.

In response to a user action, such as mouse-over the gain block 73, an exemplary embodiment may display detailed fixed-point information on the graphical model. In an embodiment, the detailed information may be provided in a separate window 75. The detailed information may include data type, minimum and/or maximum values, actual fixed-point integer/fraction lengths, the number or percent of overflows/underflows, number of bits of headroom, etc.

Figure 8:
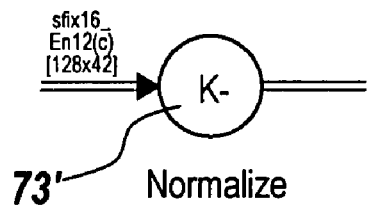
FIG. 8 shows an exemplary graphical user interface provided in an exemplary embodiment.

In other embodiments, different visual cues can be provided to convey fixed-point information on a graphical model. For example, in an exemplary embodiment, the signals and/or blocks may be displayed with lines of different shapes or thicknesses based on the information about fixed-point data type signals. In another exemplary embodiment, block icons may change dynamically to provide information about fixed-point data type signals generated from the blocks. For example, the dynamic block icon of the gain block 73 may change to a circle 73', as shown in FIG. 8, when the signal generated from the gain block 73 overflows.

Figure 9:
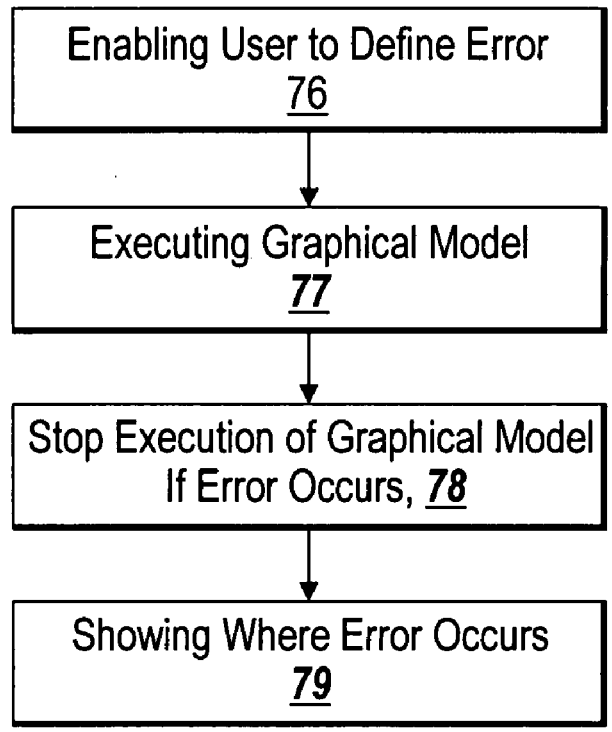
FIG. 9 is a flow chart showing another exemplary process for reporting information about fixed-point data type signals.

FIG. 9 is a flow chart showing another exemplary process for reporting information about fixed-point data type signals in a graphical modeling environment 30. In an exemplary embodiment, a user may program or define the range of overflows or underflows that stops the execution of the graphical model (step 76). When the model is executed in the graphical modeling environment (step 77) and an overflow or underflow occurs within the range that the user defines as an error, the execution engine 35 may stop the execution of the graphical model 60 (step 78), and color the block where the overflow or underflow occurs (step 79). In other embodiments, when an overflow or underflow occurs, the execution may continue with changed graphical appearances of the blocks where the overflow or underflow occurs, the execution may go into a debug mode, or the execution may pause. A user can select one of these operation modes so that the user can use debug the graphical model.

Figure 10:
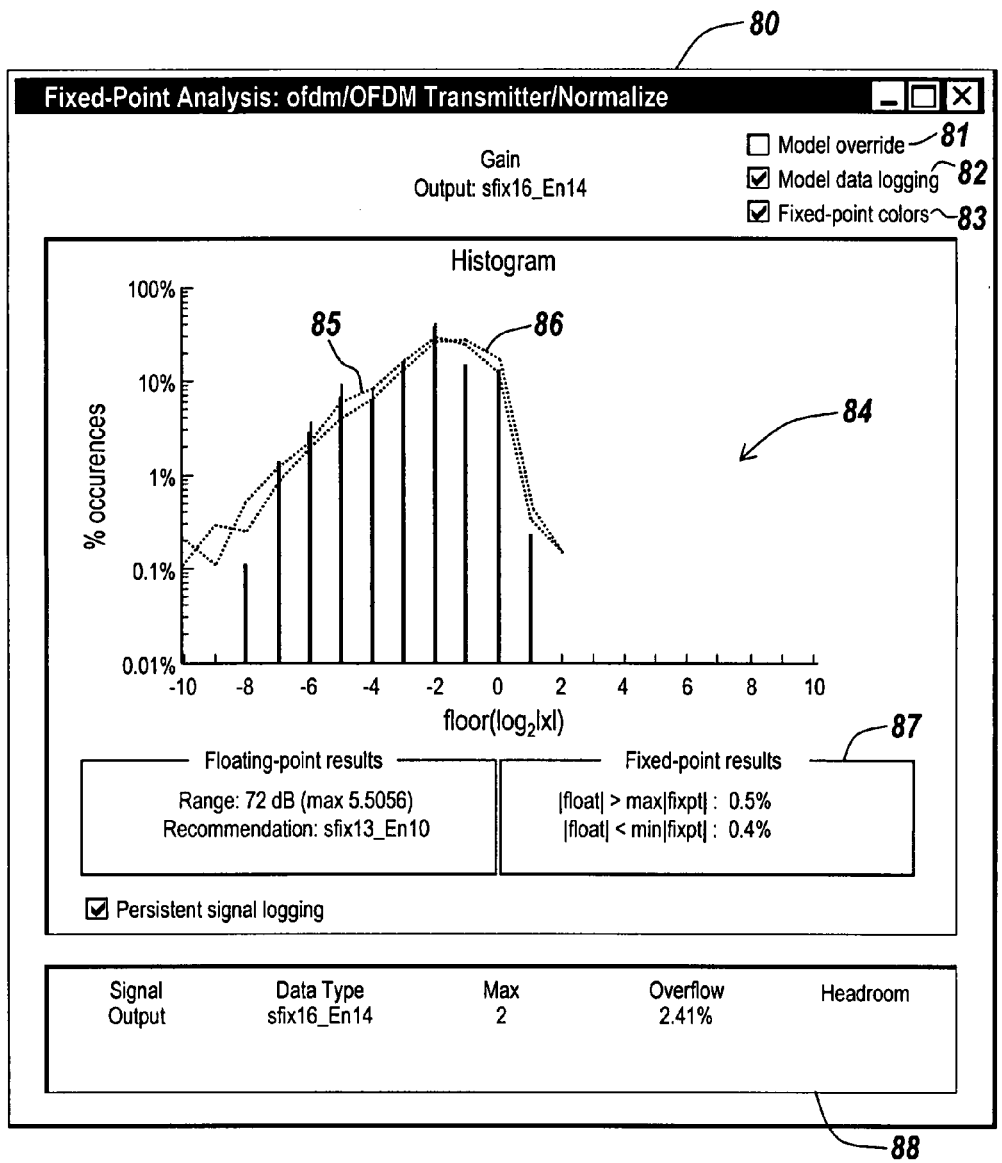
FIG. 10 depicts an exemplary user interface provided in an exemplary embodiment.

FIG. 10 is an exemplary user interface 80 provided in an exemplary embodiment. The user interface 80 may be coupled to the graphical model 60 and display data generated from a block in the graphical model. In an exemplary embodiment, the user interface displays data generated from the gain block 73 depicted in FIG. 7. The user interface 80 may enable a user to select one or more options for the simulation of the graphical model 60, such as model override 81, model data logging 82 and fixed-point colors 83. The selection of model override 81 enables floating point data types to override the graphical model 60. The selection of model data logging 82 enables the data generated in the graphical model 60 to be logged. The selection of fixed-point colors 83 enables the fixed-point data type blocks and/or signals to be colored according to the attributes of the fixed-point data type signals.

The user interface. 80 may display a histogram that visualizes the dynamic range of the signals. In the histogram, base-2 log scale is used to visualize dynamic range of the signals in terms of the number of bits of the signals. In the exemplary histogram 84, the output signal magnitude of the gain block lies in the rage of $2^{-8}$ to $2^1$. So, the output signal can be represented with 10 bits. The dotted lines 85 and 86 represent floating-point references for the real part and the imaginary part of the output signals. The floating-point references can be obtained by using the model override 81.

Other exemplary embodiment may employ different types of diagram, such as a pie chart which may provide the information in an extruded circular form with parts representing different subranges, a line diagram which may draw a linear interpolation between plots of data points that represent the different sub ranges, a stem plot which plots the values of the different subranges as vertical lines, a candlestick chart which may represent the top of the candlestick as the maximum representation of the fixed point data type, the bottom of the candlestick as the minimum representation of the fixed point data type, the top of the candle as the maximum value of the fixed point data type variable, and the bottom of the candle as the minimum value of the fixed point data type variable, etc. to visualize, e.g., the maximum and minimum representation as well as the dynamic range of the signal.

The user interface 80 may provide a pane 87 for displaying information that compares the fixed-point results with floating-point references. The user interface 80 may also provide a pane 88 for displaying detailed information about the output signal, such as data type, maximum or minimum values, overflow or underflow percentage, headroom, etc. Based on the information, the user may be able to determine whether an appropriate number of bits are allocated to the integer part of the fixed-point data type signals. The user may use the information to change a scaling factor for the fixed-point data type signal and to refine the design of the graphical model.

Since changes may be made without departing from the scope of the present invention, it is intended that the matter contained in the above description or shown in the accompanying drawings be interpreted as illustrative and not in a literal sense. Practitioners of the art will realize that the sequence of steps and architectures depicted in the figures may be altered without departing from the scope of the present invention and that the illustrations contained herein are singular examples of a multitude of possible depictions of the present invention.

We claim:

1. A computer-implemented method for modeling a target system using a fixed-point data type in a block diagram modeling environment, the method comprising:
   executing, using the computer, a block diagram model in the block diagram modeling environment, the block diagram model including a first element that has an output including a fixed-point data type signal and a second element that represents the output;
   analyzing the output to generate information about the fixed-point data type signal, the information comprising an indication of whether the fixed-point data type signal overflows or underflows;
   determining, based on the information, that a value of the fixed-point data type signal exceeds a representation boundary of a fixed length buffer allocated for the fixed-point data type signal or that the value of the fixed-point data type signal is too small to be represented with the fixed length buffer allocated for the fixed-point data type signal; and
   displaying at least one of the first and second elements using a visual cue in a display of the block diagram model to indicate that the fixed length buffer is inappropriate to represent the fixed-point data type signal.

2. The method of claim 1, wherein the visual cue is user configurable.

3. The method of claim 1, wherein the visual cue is color.

4. The method of claim 1, further comprising:
   shading the first element based on the information about the fixed-point data type signal.

5. The method of claim 1, further comprising:
   logging the fixed-point data type signal in the block diagram modeling environment;
   analyzing the logged signal to obtain information about the fixed-point data type signal; and
   displaying the information on the block diagram model.

6. The method of claim 1, wherein the information about the fixed-point data type signal comprises at least one of a maximum value, a maximum positive value, a maximum negative value, a minimum value, a minimum negative value, a minimum positive value, a dynamic range, a number of overflows, a number of underflows, a percentage of overflows, a percentage of underflows and a number of bits of headroom of the signal.

7. The method of claim 1, further comprising:
providing a recommended fixed-point data type characteristic from an analysis of the information about the fixed-point data type signal.

8. The method of claim 7, wherein the fixed-point data type characteristic is one of word size, fraction length, slope, and bias.

9. The method of claim 1, further comprising:
displaying a dynamic block icon of the first element based on the information about the fixed-point data type signal.

10. The method of claim 1, further comprising:
stopping an execution of the block diagram model when the fixed-point data type signal overflows or underflows.

11. The method of claim 1, further comprising:
pausing an execution of the block diagram model when the fixed-point data type signal overflows or underflows.

12. The method of claim 1, further comprising:
going to a debug mode when the fixed-point data type signal overflows or underflows.

13. The method of claim 10, further comprising:
enabling a user to specify a range of overflows or underflows that stop the execution of the block diagram model.

14. A computer-implemented method for modeling a target system using a fixed-point data type in a block diagram modeling environment, the method comprising:
executing, using the computer, a block diagram model in the block diagram modeling environment, the block diagram model including an element that outputs a fixed point data type signal;
displaying information of the fixed point data type signal values assumed during execution in a graphical or textual format; and
determining, based on the information, that at least one fixed-point data type signal value exceeds a representation boundary of a fixed length buffer allocated for the fixed-point data type signal or that the at least one fixed-point data type signal value is too small to be represented with the fixed length buffer allocated for the fixed-point data type signal.

15. The method of claim 14 wherein the display format is a diagram.

16. The method of claim 15, wherein the diagram is one of a histogram, a pie chart, a line diagram, a stem plot, a candlestick chart.

17. The method of claim 14, wherein the display format is textual.

18. The method of claim 17, wherein the textual format is a table.

19. A system for obtaining a block diagram model using a fixed-point data type, the system comprising:
an execution engine implemented in a computing device for:
executing a block diagram model, the block diagram model including a first element that has an output including a fixed-point data type signal and a second element that represents the output,
analyzing the output to generate information about the fixed-point data type signal, the information comprising an indication of whether the fixed-point data type signal overflows or underflows;
determining, based on the information, that a value of the fixed-point data type signal exceeds a representation boundary of a fixed length buffer allocated for the fixed-point data type signal or that the value of the fixed-point data type signal is too small to be represented with the fixed length buffer allocated for the fixed-point data type signal; and
a first user interface element for displaying at least one of the first and second elements in color on the block diagram model to indicate that the fixed length buffer is inappropriate to represent the fixed-point data type signal.

20. The system of claim 19, wherein the visual cue is color.

21. The system of claim 19, further comprising:
a second user interface element for shading an interior of the first element based on the information about the fixed-point data type signal.

22. The system of claim 19, further comprising:
a storage space for logging the information about the fixed-point data type signal in the block diagram modeling environment.

23. The system of claim 19, wherein the information about the fixed-point data type signal comprises at least one of a maximum value, a minimum value, a minimum negative value, a minimum positive value, a dynamic range, a number of overflows, a number of underflows, a percentage of overflows, a percentage of underflows and a number of bits of headroom of the signal.

24. The system of claim 23, wherein the system provides a recommended word size, slope, bias and/or fraction length from an analysis of the information about the fixed-point data type signal.

25. The system of claim 19, further comprising:
a dynamic block icon of the first element displayed based on the information about the fixed-point data type signal.

26. The system of claim 19, wherein the execution engine stops or pauses an execution of the block diagram model when the fixed-point data type signal overflows or underflows.

27. The system of claim 19, wherein the execution engine goes to a debug mode when the fixed-point data type signal overflows or underflows.

28. A computing device for modeling a target system using a fixed-point data type in a block diagram modeling environment, the device comprising:
a first process for executing a block diagram model in the block diagram modeling environment, the block diagram model including an element that outputs a fixed point data type signal;
a second process for displaying information of the fixed point data type signal values assumed during execution in a graphical or textual format; and
a third process for determining, based on the information, that at least one fixed-point data type signal value exceeds a representation boundary of a fixed length buffer allocated for the fixed-point data type signal or that the at least one fixed-point data type signal value is too small to be represented with the fixed length buffer allocated for the fixed-point data type signal.

29. The device of claim 28 wherein the display format is a diagram.

30. The device of claim 29, wherein the diagram is one of a histogram, a pie chart, a line diagram, a stem plot, a candlestick chart.

31. The device of claim 28, wherein the display format is textual.

32. The device of claim 31, wherein the textual format is a table.

33. A tangible medium holding instructions executable in a computing device for modeling a target system using a fixed-point data type in a block diagram modeling environment, the medium comprising:
 instructions for executing a block diagram model in the block diagram modeling environment, the block diagram model including a first element that has an output including a fixed-point data type signal and a second element that represents the output;
 instructions for analyzing the output to generate information about the fixed-point data type signal, the information comprising an indication of whether the fixed-point data type signal overflows or underflows;
 instructions for determining, based on the information, that a value of the fixed-point data type signal exceeds a representation boundary of a fixed length buffer allocated for the fixed-point data type signal or that the value of the fixed-point data type signal is too small to be represented with the fixed length buffer allocated for the fixed-point data type signal; and
 instructions for displaying at least one of the first and second elements using a visual cue in a display of the block diagram model to indicate that the fixed length buffer is inappropriate to represent the fixed-point data type signal.

34. The medium of claim 33, wherein the visual cue is user configurable.

35. The medium of claim 33, wherein the visual cue is color.

36. The medium of claim 33, further comprising:
 shading the first element based on the information about the fixed-point data type signal.

37. The medium of claim 33, further comprising:
 logging the fixed-point data type signal in the block diagram modeling environment;
 analyzing the logged signal to obtain information about the fixed-point data type signal; and
 displaying the information on the block diagram model.

38. The medium of claim 33, wherein the information about the fixed-point data type signal comprises at least one of a maximum value, a maximum positive value, a maximum negative value, a minimum value, a minimum negative value, a minimum positive value, a dynamic range, a number of overflows, a number of underflows, a percentage of overflows, a percentage of underflows and a number of bits of headroom of the signal.

39. The medium of claim 33, further comprising:
 instructions for providing a recommended fixed-point data type characteristic from an analysis of the information about the fixed-point data type signal.

40. The medium of claim 39, wherein the fixed-point data type characteristic is one of word size, fraction length, slope, and bias.

41. The medium of claim 33, further comprising:
 instructions for displaying a dynamic block icon of the first element based on the information about the fixed-point data type signal.

42. The medium of claim 33, further comprising:
 instructions for stopping an execution of the block diagram model when the fixed-point data type signal overflows or underflows.

43. The medium of claim 42, further comprising:
 instructions for enabling a user to specify a range of overflows or underflows that stop the execution of the graphical model.

44. The medium of claim 33, further comprising:
 instructions for pausing an execution of the block diagram model when the fixed-point data type signal overflows or underflows.

45. The medium of claim 33, further comprising:
 instructions for going to a debug mode when the fixed-point data type signal overflows or underflows.

46. A computer-implemented tangible medium for modeling a target system using a fixed-point data type in a block diagram modeling environment, the medium comprising instructions for:
 executing a block diagram model in the block diagram modeling environment, the block diagram model including an element that outputs a fixed point data type signal;
 displaying information of the fixed point data type signal values assumed during execution in a graphical or textual format; and
 determining, based on the information, that at least one fixed-point data type signal value exceeds a representation boundary of a fixed length buffer allocated for the fixed-point data type signal or that the at least one fixed-point data type signal value is too small to be represented with the fixed length buffer allocated for the fixed-point data type signal.

47. The medium of claim 46 wherein the display format is a diagram.

48. The medium of claim 47, wherein the diagram is one of a histogram a pie chart, a line diagram, a stem plot, a candlestick chart.

49. The medium of claim 46, wherein the display format is textual.

50. The medium of claim 49, wherein the textual format is a table.

51. A method for providing information on a fixed-point data type variable in a text-based programming environment, comprising:
 providing, using a computing device, a text-based program on the text-based programming environment; and
 graphically displaying information about a fixed-point data type variable in the text-based program, the information comprising an indication of whether the fixed-point data type variable overflows or underflows, wherein the information is displayed on the text-based program; and
 determining, based on the information, that a value of the fixed-point data type variable exceeds a representation boundary of a fixed length buffer allocated for the fixed-point data type variable or that the value of the fixed-point data type variable is too small to be represented with the fixed length buffer allocated for the fixed-point data type variable.

52. The method of claim 51, wherein the information about the fixed-point data type variable comprises at least one of a maximum value, a minimum value, a minimum negative value, a minimum positive value, a dynamic range, a number of overflows, a number of underflows, a percentage of overflows, a percentage of underflows and a number of bits of headroom of the variable.

53. The method of claim 51, further comprising:
 highlighting one or more textual elements of the text-based program to provide fixed-point information relating to the highlighted textual elements.

54. The method of claim 53, wherein the textual elements comprise variables or functions.

55. The method of claim 51, further comprising:
 providing mouse-over information regarding fixed-point information of the lines over which a pointing device moves.

56. The method of claim 55, wherein the mouse-over information is provided in one of a popup, a tooltip, a status bar, and a dedicated display area.

57. A system for providing information on a fixed-point data type variable in a text-based programming environment, comprising:
- a display for displaying a text-based program in the text-based programming environment;
- a user interface provided in the display for:
  - graphically displaying information about a fixed-point data type variable in the text-based program, the information comprising an indication of whether the fixed-point data type variable overflows or underflows, wherein the user interface is provided over the text-based program; and
  - determining, based on the information, that a value of the fixed-point data type variable exceeds a representation boundary of a fixed length buffer allocated for the fixed-point data type variable or that the value of the fixed-point data type variable is too small to be represented with the fixed length buffer allocated for the fixed-point data type variable.

58. The system of claim 57, wherein the information about the fixed-point data type variable comprises at least one of a maximum value, a minimum value, a minimum negative value, a minimum positive value, a dynamic range, a number of overflows, a number of underflows, a percentage of overflows, a percentage of underflows and a number of bits of headroom of the variable.

59. The system of claim 57, wherein one or more textual elements of the text-based program are highlighted to indicate that the fixed-point information relates to the highlighted textual elements.

60. The system of claim 59, wherein the textual elements comprise variables or functions.

61. The system of claim 57, wherein the user interface provides mouse-over information regarding fixed-point information of the lines over which a pointing device moves.

62. The system of claim 61, wherein the mouse-over information is provided in one of a popup, a tooltip, a status bar, and a dedicated display area.

63. A tangible medium holding instructions executable in a computing device for providing information on a fixed-point data type variable in a text-based programming environment, comprising:
- instructions for providing a text-based program on the text-based programming environment;
- instructions for graphically displaying information about a fixed-point data type variable in the text-based program, the information comprising an indication of whether the fixed-point data type variable overflows or underflows, wherein the information is displayed on the text-based program; and
- instructions for determining, based on the information, that a value of the fixed-point data type variable exceeds a representation boundary of a fixed length buffer allocated for the fixed-point data type variable or that the value of the fixed-point data type variable is too small to be represented with the fixed length buffer allocated for the fixed-point data type variable.

64. The medium of claim 63, wherein the information about the fixed-point data type variable comprises at least one of a maximum value, a minimum value, a minimum negative value, a minimum positive value, a dynamic range, a number of overflows, a number of underflows, a percentage of overflows, a percentage of underflows and a number of bits of headroom of the variable.

65. The medium of claim 63, further comprising:
- instructions for highlighting one or more textual elements of the text-based program to provide fixed-point information relating to the highlighted textual elements.

66. The medium of claim 65, wherein the textual elements comprise variables or functions.

67. The medium of claim 63, further comprising:
- instructions for providing mouse-over information regarding fixed-point information of the lines over which a pointing device moves.

68. The medium of claim 67, wherein the mouse-over information is provided in one of a popup, a tooltip, a status bar, and a dedicated display area.

\* \* \* \* \*